(12) United States Patent
Huang et al.

(10) Patent No.: US 6,343,644 B1
(45) Date of Patent: Feb. 5, 2002

(54) HOLLOW SCREW COOLING DEVICE

(75) Inventors: Horng-Chieh Huang, Taipei; Kun-Lung Tsai, Hsinchu; Ching-Yuan Lin, Taichung; Chi-Chen Lin, Changhua, all of (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/521,920

(22) Filed: Mar. 9, 2000

(30) Foreign Application Priority Data

Jan. 28, 2000 (TW) .......................................... 89201501

(51) Int. Cl.⁷ ................................................ F28D 11/02
(52) U.S. Cl. ............................ 165/90; 165/86; 165/89; 165/87; 165/DIG. 135; 429/46
(58) Field of Search ........................... 165/87, 90, 89, 165/86, DIG. 135, DIG. 139, DIG. 156; 429/46

(56) References Cited

U.S. PATENT DOCUMENTS

| | | | | |
|---|---|---|---|---|
| 3,305,742 A | * | 2/1967 | McCune ........................ | 165/90 |
| 3,310,836 A | * | 3/1967 | Nichols ........................ | 165/87 |
| 3,477,500 A | * | 11/1969 | Sear ............................ | 165/89 |
| 3,583,687 A | * | 6/1971 | Nakahara ..................... | 165/90 |
| 3,946,803 A | * | 3/1976 | Hertzer et al. ................ | 165/87 |
| 3,989,101 A | * | 11/1976 | Manfredi ..................... | 165/86 |
| 4,059,777 A | * | 11/1977 | Whiteley ..................... | 165/86 |
| 4,073,338 A | * | 2/1978 | Fujikake et al. .............. | 165/86 |
| 4,582,128 A | * | 4/1986 | Jarreby ........................ | 165/90 |
| 4,986,345 A | * | 1/1991 | Vemura et al. ............... | 165/87 |
| 5,778,971 A | * | 7/1998 | Szam .......................... | 165/90 |
| 5,843,282 A | * | 12/1998 | Schmitt et al. ............... | 165/90 |
| 6,186,755 B1 | * | 2/2001 | Haga ........................... | 165/86 |
| 6,203,072 B1 | * | 3/2001 | Berghuis et al. .............. | 165/90 |

FOREIGN PATENT DOCUMENTS

JP    0001451   * 1/1979   .................. 165/86

* cited by examiner

Primary Examiner—Christopher Atkinson
(74) Attorney, Agent, or Firm—Rabin & Berdo, P.C.

(57) ABSTRACT

A hollow screw cooling device, which has a set of apertures provided on an oil-proof base on the driven end of the hollow screw. By having fixing screws go through the apertures and the through holes on the bearing press board and fixed on the bearing base, the oil-proof base can be fixed on the outer side of the bearing press board. By directly taking off fixing screws, the oil-proof base can be directly taken off the bearing base when maintaining or replacing the seal without disassembling the components such as the bearing and bearing device.

6 Claims, 4 Drawing Sheets

HOLLOW SCREW COOLING DEVICE

BACKGROUND OF THE INVENTION

1. Field of the Invention

The present invention relates to a hollow screw cooling device and, more particularly, to a hollow screw cooling device that is easy to maintain and assemble.

2. Description of the Prior Art

The hollow screw is frequently used as the feed apparatus in high speed rotating machine such as the machining center. The hollow screw in the prior art is disclosed, for example, as the H-shaped hollow screw produced by NSK Ltd. The main structure of the hollow screw is shown in FIG. 4. Each end of the screw 90 is supported by a bearing device 91. The screw is driven to rotate by a driving source such as a servo motor and drives a table 93 fixed on a screw nut 92 to have linear reciprocal motion.

To follow the trend of high speed feed, the inner portion of the screw 90 is hollow. Coolant is forced to circulate within the screw 90 by, for example, a pump so as to bring out heat generated during high speed operation. A conduit 94 of a proper length is provided along the axial direction within the hollow screw 90. One end of the conduit 94 connects to a coolant inlet formed on one end of the screw 90; the other end connects to a coolant outlet 95 formed on the driven end of the screw 90. The coolant outlet 95 is fixed on an oil-proof base 96 on the inner side of the bearing device 91 over the driven end of the screw 90 and connects to the conduit 94 through a cross pipe 97.

A rubber seal 98 in close contact with the screw 90 is provided within the oil-proof base 96. The seal 98 is likely to get vulcanized after a certain period of use or damaged due to friction under high rotating speed, thus it has to be maintained or replaced periodically. Since the oil-proof base 96 is mounted on the inner side of the bearing device 91 on the driven end, the bearing device 91 on the driven end has to be taken off first so that the oil-proof base 96 can be disassembled to take off the seal 98 for maintenance or replacement. This process is very complicated and time-consuming, and a high precision adjustment has to be performed on the screw 90 again after putting back the bearing device 91. So the maintenance and replacement of the seal 98 require a technician skilled in the art spending a long time to finish the job. This does not only affect the efficiency of the machining center but also is not economical at all.

In view of the foregoing drawbacks of the hollow screw in the prior art, the inventor made efforts to modify and improve the structure and, after many years of hard working and researches, finally came up with the hollow screw cooling device.

SUMMARY OF THE INVENTION

It is an object of the present invention to provide a hollow screw cooling device, which does not need to take off components such as the bearing and being device while maintaining and replacing the seal. The maintenance operation is fairly simple and fast. Furthermore, there is no need to perform a high precision adjustment on the screw after putting back the seal and the oil-proof base. This maintenance operation can be done by ordinary staff, which greatly saves costs in human power and time.

Another object of the present invention is to provide a hollow screw cooling device, wherein a seal is installed on the end with a smaller diameter of the screw. The radius of the seal decreases. The angular speed of the rotating seal also decreases as the radius diminishes. Therefore, the abrasion of the seal can be slower while the seal lifetime can be elongated. At the same time, fewer seal maintenance and replacements are needed.

Moreover, the present invention provides a hollow screw cooling device, which has a fall cooling effect on the bearing device and bearing and elongates its lifetime.

The hollow screw cooling device achieving the above objects has a set of apertures formed on the oil-proof base. The base is fixed on the outer side of a bearing press board by screws going through the apertures and the through holes on the bearing press board. By taking off the fixing screws, the oil-proof base can be directly separated from the bearing device for seal maintenance and replacement without the need to disassemble other components such as the bearing and bearing device.

BRIEF DESCRIPTION OF THE DRAWINGS

The drawings disclose an illustrative embodiment of the present invention which serves to exemplify the various advantages and objects hereof, and are as follows.

DETAILED DESCRIPTION OF THE PREFERRED EMBODIMENT

Figure 1:
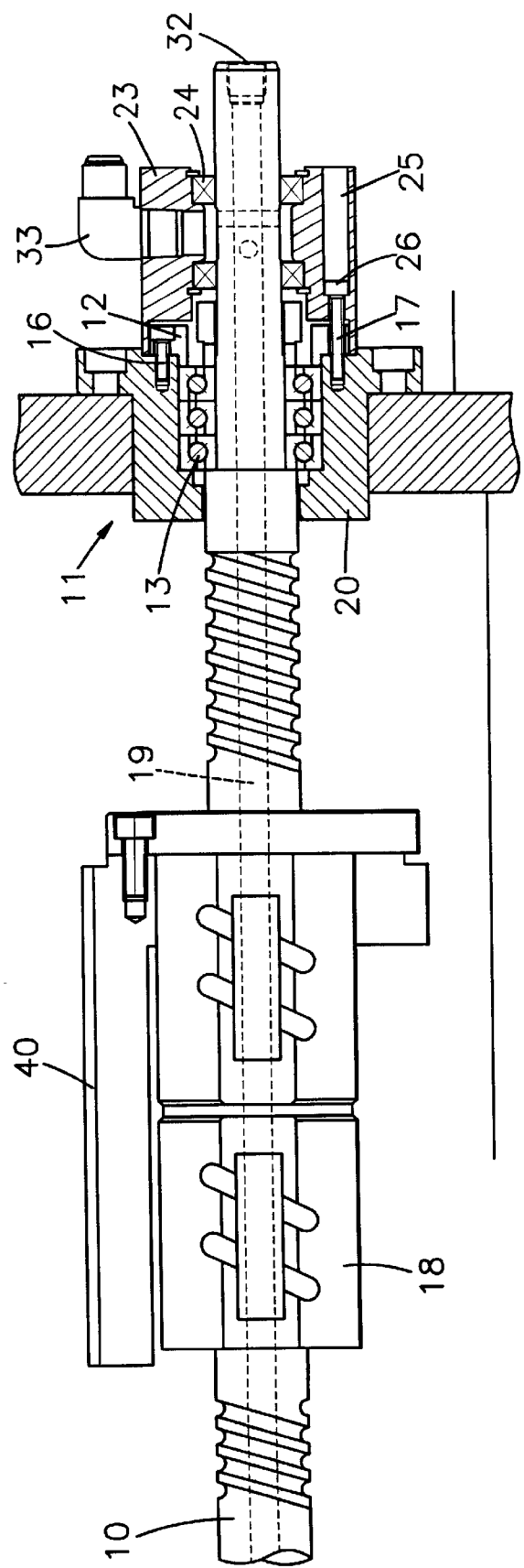
FIG. 1 is an axial cross section of the hollow screw cooling device according to the present invention.

Referring to FIG. 1, the hollow screw 10 provided by the present invention is supported by a bearing device 11 and driven to rotate by a driving source such as a servo motor. The hollow screw 10 drives a table 40 fixed on a screw nut 18 to make linear reciprocal motion. A conduit 19 of a proper length is provided along the axial direction within the hollow screw 10. One end of the conduit 19 connects to a coolant inlet (not shown) formed on one end of the screw 10; the other end connects to a coolant outlet 33 formed on the driven end of the screw 10. The coolant is driven by, for example, a pump to circulate within the conduit 19 in the screw 10 so as to carry away heat generated in high speed operation.

Figure 2:
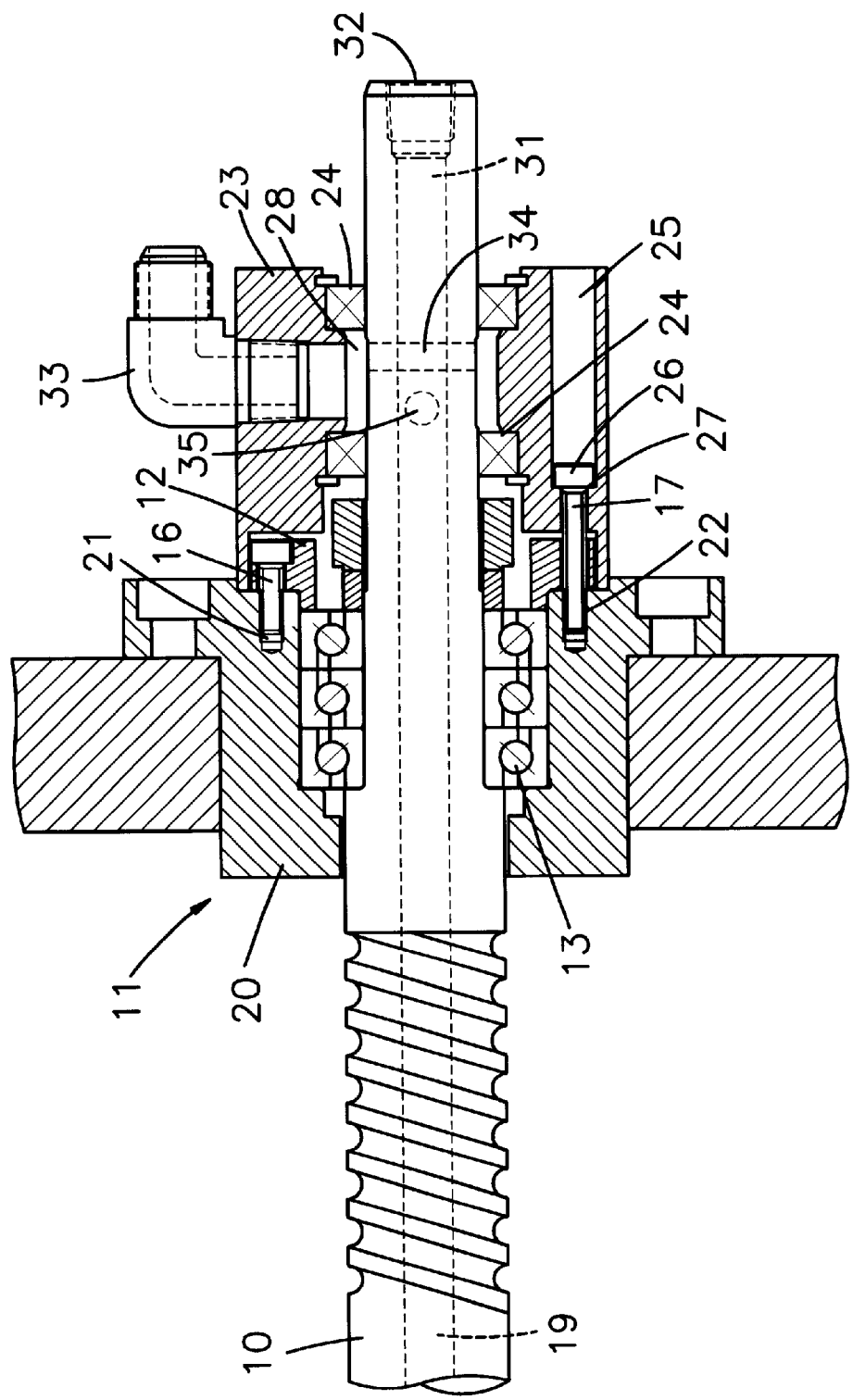
FIG. 2 is an enlarged axial cross section of the hollow screw cooling device according to the present invention.
Figure 3:
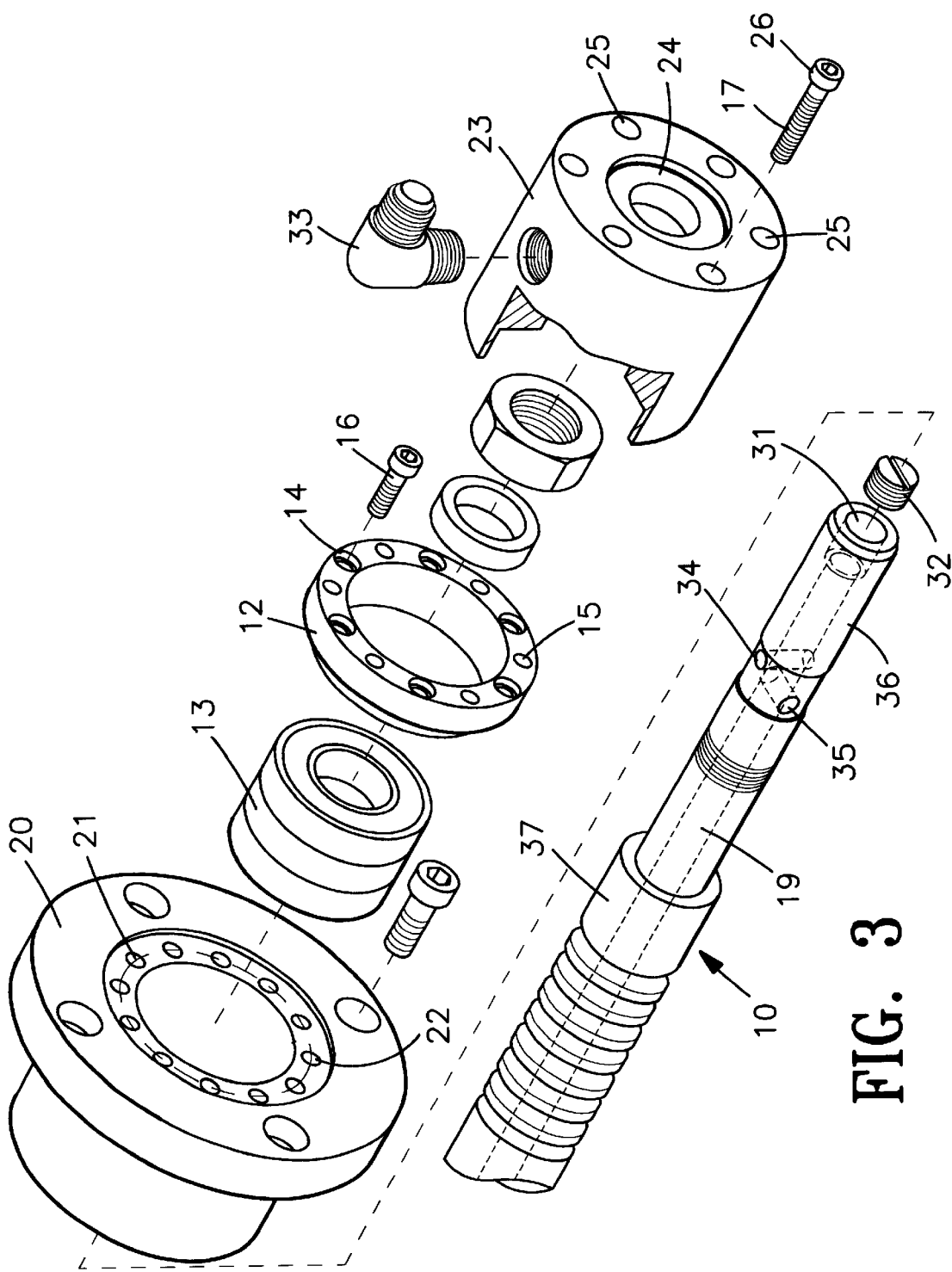
FIG. 3 is a three dimensional perspective of the hollow screw cooling device according to the present invention.
Figure 4:
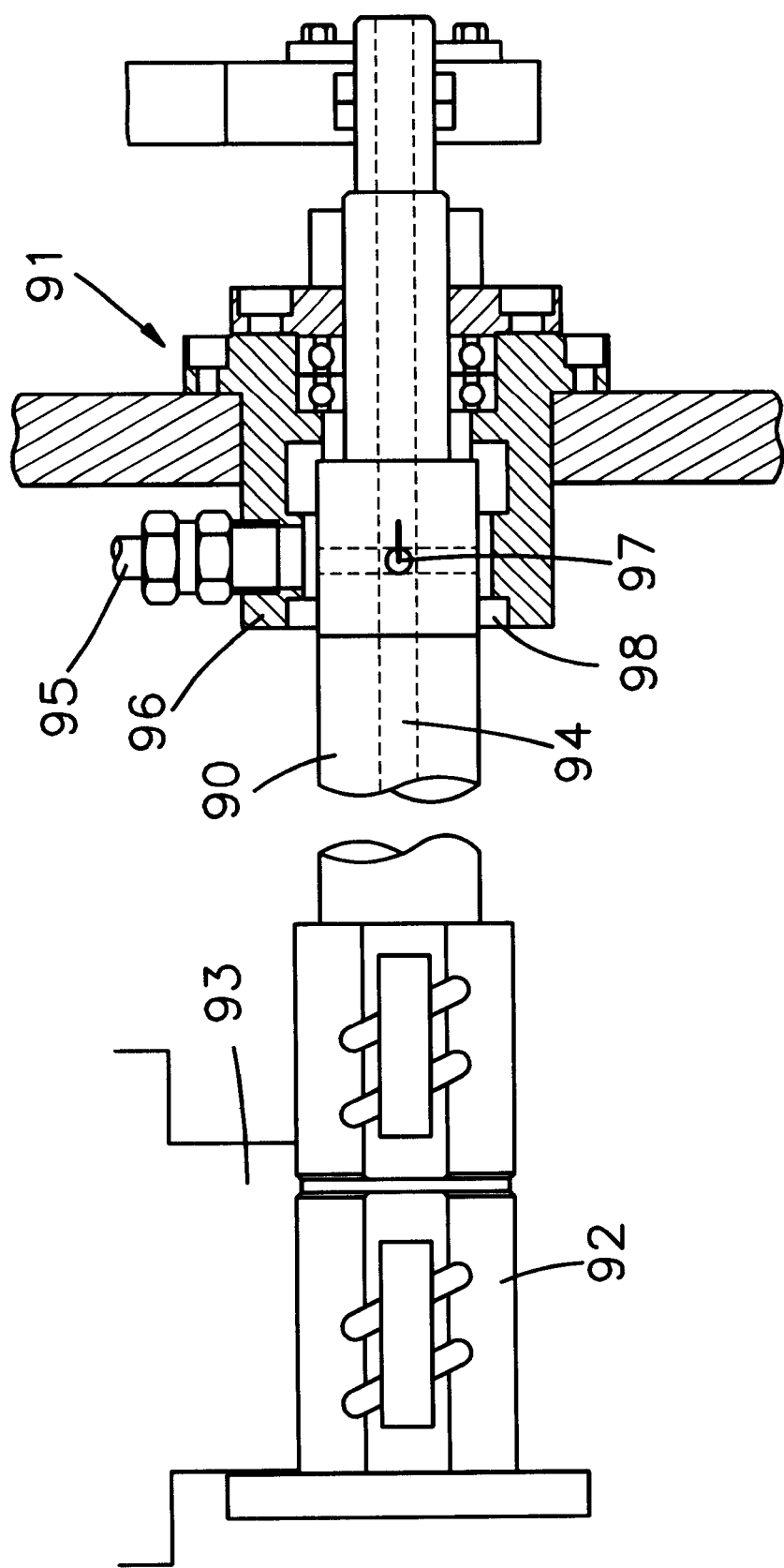
FIG. 4 is an axial cross section of the hollow screw cooling device in the prior art.

Please refer to FIGS. 2 and 3. On the outer side of the bearing device 11 on the driven end of the hollow screw 10, a plurality of angular ball bearings 13 are fixed within the bearing device 11 along the axial direction by a press board 12. The press board 12 is formed with two sets of through holes 14, 15. A first set of fixing screws 16 goes through the first set of through holes 14 and is fixed onto a first set of screw holes 21 on the bearing base 20 of the bearing device 11. So the press board 12 is fixed on the outer surface of the bearing base 20. The oil-proof base 23 for fixing the seal 24 is formed with a plurality of apertures 25 aligned with the second set of through holes 15. A second set of fixing screws 17 goes through the apertures 25 and the second set of through holes 15 and reaches a second set of screw holes 22 on the bearing base 20. The screw heads 26 of the second set of fixing screws 17 press the surface 27 formed within the apertures 25 so as to fix the oil-proof base on the outer side of the press board 12 without direct contact. In the aforementioned hollow screw cooling device, the oil-proof base 23 can be directly taken off for the maintenance and replacement of the seal 24 by directly disassembling the second set of fixing screws 17.

As shown in FIGS. 2 and 3, the seal 24 for preventing coolant leakage is installed on the small-diameter end of the hollow screw 10. The seal 24 used in this invention has a smaller radius than the one installed on the big-diameter end as used in the prior art. Therefore, the angular speed of the rotating seal 24 in the present invention decreases as the radius decreases. The abrasion on the seal 24 is thus lowered, which can effectively elongate its lifetime and decrease the number of services.

Moreover, first coolant through hole 34 and second coolant through hole 35 arranged perpendicular to each other and separated by a distance are provided between the seals 24 on both sides of the screw 10 for connecting the coolant conduit 19 in the screw 10 and the coolant outlet 33 fixed on the oil-proof base 23. The coolant can flow from the conduit 19 in the screw 10 via the first and second coolant through holes 34, 35 to a screw slit 28 and go out of the coolant outlet 33. The opening 31 of the conduit 19 is closed by a plug 32 so that the circulating coolant within the conduit 19 can only flow through the first and second coolant through holes 34, 35 to the coolant outlet 33. The first and second coolant through holes 34, 35 can enhance the structure strength and torque rigidity when compared with the cross shape through hole in the prior art so as to elongate the lifetime and maintain the precision of the high speed rotating screw 10.

Compared with the prior art, the hollow screw cooling device of the present invention has the following advantages:

1. A set of apertures is formed on the oil-proof base. The base is fixed on the outer side of a bearing press board by screws going through the apertures and the through holes on the bearing press board. By taking off the fixing screws, the oil-proof base can be directly separated from the bearing for seal maintenance and replacement without the need to disassemble other components such as the bearing and bearing device. The maintenance operation is fairly simple and fast. Furthermore, there is no need to perform a high precision adjustment on the screw after putting back the seal and the oil-proof base. This maintenance operation can be done by ordinary staff, which greatly saves costs in human power and time.

2. A first coolant through hole and second coolant through hole arranged perpendicular to each other and separated by a distance are provided between the seals on both sides of the screw for connecting the coolant conduit in the screw 10 and the coolant outlet fixed on the oil-proof base. This structure can enhance the structure strength and torque rigidity so as to elongate the lifetime and maintain the precision of the high speed rotating screw.

3. The components such as the bearing device and the bearing can be fully cooled and thus its lifetime can be increased.

4. The seal is installed on the small-diameter end of the hollow screw so that both the seal radius and the angular speed decrease. The rotational abrasion of the seal is lowered and thus the seal lifetime can be effectively elongated.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A hollow screw cooling device, which comprises:
    a hollow screw, which is provided with a coolant conduit therein extending along an axial direction;
    a bearing device, which is installed on a driven end of said hollow screw, said bearing device having a first set of threaded holes and a second set of threaded holes;
    a plurality of bearings arranged along the axial direction and being disposed within said bearing device;
    a press board fixing said bearings within said bearing device, said press board being formed with a first set of through holes and a second set of through holes;
    a first set of threaded fasteners, each threaded fastener of said first set extending through a respective through hole of said first set of through holes in said press board and being threadably received by a respective threaded hole of said first set of threaded holes so as to fix said press board on an outer surface of a bearing base of said bearing device;
    an oil-proof base, which is provided with a plurality of seals for preventing coolant leakage, said oil-proof base being provided with a set of apertures aligned with said second set of through holes in said press board and aligned with said second set of threaded holes; and
    a second set of threaded fasteners, each threaded fastener of said second set of threaded fasteners respectively extending through a respective aperture in said oil-proof base, through a respective through hole of said second set of through holes in said press board, and being threadably received by a respective threaded hole of said second set of threaded holes so as to fix said oil-proof base to said bearing device;
    wherein each of said threaded fasteners of said second set of threaded fasteners is removable from the respective threaded holes of said second set of threaded holes so as to allow said oil-proof base to be removed from said bearing device; and
    wherein when said oil-proof base is removed from said bearing device, each of said threaded fasteners of said first set of threaded fasteners remains within the respective through holes of said first set of through holes in said press board and remain threadably received by the respective threaded holes of said first set of threaded holes, so as to keep said press board fixed to the outer surface of the bearing base of said bearing device.

2. The device according to claim 1, wherein said oil-proof base is installed on an end of said bearing device so that said seals on said oil-proof base can be directly taken off for maintenance without disassembling said bearing device.

3. The device according to claim 1, wherein said seals are installed on a small-diameter end of said hollow screw.

4. The device according to claim 1, wherein said hollow screw is further provided with first and second coolant through holes arranged perpendicular to each other and separated by a distance for connecting said coolant conduit and a coolant outlet fixed on said oil-proof base.

5. The device according to claim 4, wherein said first and second coolant through holes are formed between two of said seals in said oil-proof base.

6. The device according to claim 1, wherein a screw slit is formed outside said hollow screw and between two of said seals in said oil-proof base so that the coolant can flow out thereof.

* * * * *